(No Model.)
J. DE BUTTS.
WHEEL FOR CORN PLANTERS AND MARKERS.
No. 445,713. Patented Feb. 3, 1891.
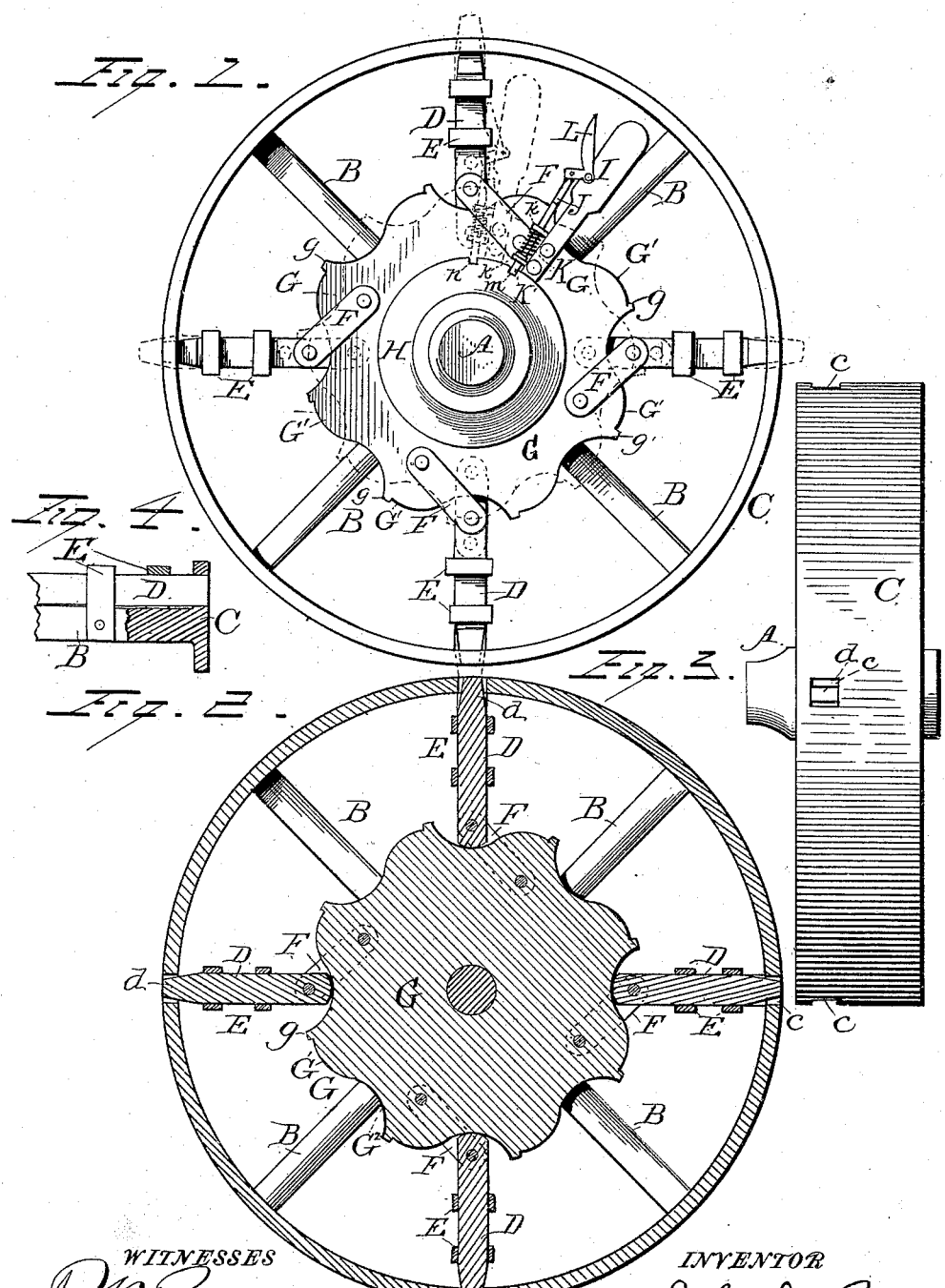
WITNESSES
J. W. Reynolds
Joseph E. Stack
INVENTOR
John De Butts
By Wm. H. Babcock
Attorney

UNITED STATES PATENT OFFICE.

JOHN DE BUTTS, OF NEAR CENTREVILLE, MARYLAND.

WHEEL FOR CORN-PLANTERS AND MARKERS.

SPECIFICATION forming part of Letters Patent No. 445,713, dated February 3, 1891.

Application filed October 7, 1890. Serial No. 367,345. (No model.)

*To all whom it may concern:*

Be it known that I, JOHN DE BUTTS, a citizen of the United States, residing near Centreville, in the county of Queen Anne and State of Maryland, have invented certain new and useful Improvements in Wheels for Corn-Planters and Markers; and I do hereby declare the following to be a full, clear, and exact description of the invention, such as will enable others skilled in the art to which it appertains to make and use the same.

This invention is intended more especially as an improvement on the transporting-wheels used in the corn-planters and markers described in my patent, No. 378,164, and my pending application, Serial No. 362,918, although it is obviously applicable to any wheel where slipping on a hillside or incline is to be prevented. This I effect by means of a series of protruding points on radial bars, which are forced outward through openings in the periphery of said wheel by the action of peripheral cams on a cam wheel or disk rotatable by hand, the said arms being also connected to said disk by links, and the links, arms, and cams being relatively constructed and arranged so that said arms bear always against said cams when protruding at all, the cam-disk bearing the strain on its periphery.

My invention consists in the combination of devices constructed and arranged for such action and in certain details of construction, all as hereinafter more particularly set forth and claimed.

In the accompanying drawings, Figure 1 represents a perspective view of a wheel provided with the devices embodying my invention. Fig. 2 represents a vertical section through the same on the plane passing through the points which prevent slipping. Fig. 3 represents a front elevation of the wheel, and Fig. 4 a detail plan view of one spoke and bar.

A designates the hub of the wheel, B the spokes, and C the rim or tire, which is made broad and provided at intervals with openings $c$. These openings are arranged opposite a series of pointed radial bars D, so that each opening will allow the point $d$ of one of said bars to protrude when said bar is moved outward. These bars are allowed such motion; but each of them is confined to some part of the wheel, preferably one of the spokes, by one or more guide bands or straps E. The inner ends of these bars are connected by links F, one pair for each, with a cam wheel or disk G, which is mounted freely on said hub, although held against disengagement therefrom by a hub-band or collar H. This cam wheel or disk has its periphery scalloped, so as to form a series of peripheral cams $G'$, one for each bar, with intervening recesses $G^2$. At the end of each cam is a shoulder $g$. The point of attachment of each link F to said disk is in line with the center of the latter and with the crown of one of said cams. This point of attachment or pivotal point of said links occupies the center of the circle of which the curvature of said cam forms a part. The bar D is attached to said links at such a distance from its inner end that the latter will be in contact with the periphery of the said cam when the said links are in line with the said bar. The above-described adaptation of the said cam and links to each other in the shape of the former and their relative arrangement with the curvature of the adjoining recess will insure the fitting of the inner end of said bar against the periphery of said disk at all times. This, however, is not very important except when the point of the bar is protruded or undergoing protrusion. It frequently happens in such circumstances that the bar-point strikes against a stone as the wheel turns. My construction then insures an adequate brace behind said bar, the strain coming on the periphery of the wheel and not on any stud, pivot, or other weak point. The links alone might move the bars out; but their pivots could not be relied on to withstand such a strain. When said disk or cam-wheel is turned on the hub in one direction, the cams thrust the bars D outward simultaneously, their points $d$ passing through the openings $c$ and entering the ground as the wheel turns in order to prevent slipping. Each bar and its strap are then in alignment. The shoulders $g$ will prevent the cam-wheel from turning too far in the direction referred to if said links should yield a little; but the latter with the guide-bands will suffice ordinarily for that purpose. When the cam-wheel is turned in the other direction, the links, taking an inclined position, draw said bar inward and leave the periphery of the wheel without projections. For convenience in thus turning or rocking said cam wheel or disk in either direction, as desired, I attach thereto a lever I, practically constituting a handle therefor. Each pair of links is preferably attached to opposite sides of the said cam wheel or disk, with the inner end of the bar between them.

The operation has been already sufficiently described. While running on level ground the points $d$ are kept flush with the tread of the wheel. Before ascending or descending a hill they are thrust outward, as stated, and there will be no slipping. They remain in either position until moved by hand through the medium of the actuating devices shown. I prefer these, but do not wish to confine myself solely thereto. To fasten the cam-disk G in either one of the two positions to which it may be turned, as hereinbefore described, by handle or lever I, a sliding rod J is employed, engaging with one of two notches $m$ $n$ in the periphery of the hub-band H. This rod passes through a guide $k'$, attached to the lever I, and is attached at its outer end to a bell-crank lever L, which is pivoted at its angle to said handle I. A fixed collar $k$ on the lower part of said rod receives the pressure of a spring K, which bears at its upper end against the guide $k'$. The spring and rod together constitute a spring-catch for automatically locking the cam-disk to the hub-band when the notches $m$ or $n$ come under said catch. The operator's hand, clasping bell-crank lever L, withdraws the rod and thus releases them.

Having thus fully described my invention, what I claim as new, and desire to secure by Letters Patent, is—

1. In combination with a wheel having holes in its periphery, a cam wheel or disk, a series of bars having points capable of protrusion through said openings, and a series of links connecting said bars to said disk, the said parts being arranged to have the inner ends of said bars in contact with said cams when said points are protruded, in order that the disk may bear the strain, substantially as set forth.

2. In combination with a wheel having openings in its periphery, a series of bars having points arranged to protrude through said openings, a wheel or disk having cams on its periphery in contact with the inner ends of said bars, respectively, and links connecting the said bars, to said disk, the inner pivotal point of each link being the center of the circle of which the curvature of the proximate cam forms a part, substantially as set forth.

3. In combination with the wheel and axle, the cam wheel or disk G, mounted freely thereon and having cams G' on its periphery, the handle I, attached to said disk, the radial bars arranged to be acted on by said cams and to protrude through openings in the periphery of the wheel, the links F, arranged in pairs on each side of said disk in the rear of the cams, respectively, and connecting said disk with said bars, a spring-pressed locking-catch attached to said handle, and an attachment of the hub having notches or recesses for engagement with said catch, substantially as set forth.

JNO. DE BUTTS.

Witnesses:
A. G. HARLEY, Jr.,
S. N. MOORE.